Patented Sept. 26, 1950

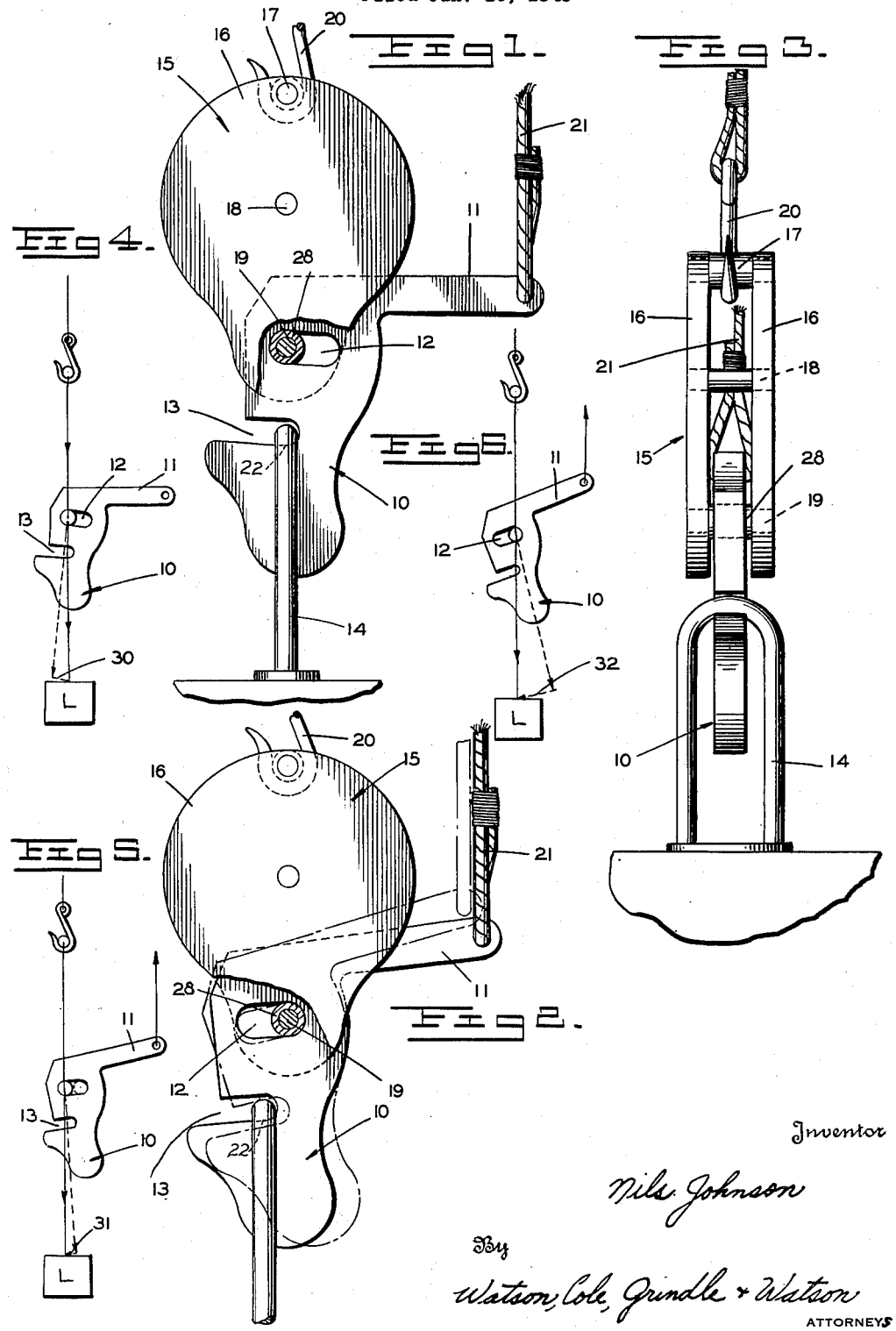

2,523,434

UNITED STATES PATENT OFFICE 2,523,434

RELEASABLE CARGO HOOK

Nils Johnson, Silver Spring, Md.

Application January 10, 1949, Serial No. 70,129

5 Claims. (Cl. 294—83)

This invention relates to heavy duty cargo hooks which are provided with means for facilitating the release of the load carried by the hook.

The purpose of this invention is to provide a cargo hook which is capable of securely retaining heavy loads and which can be operated with a minimum force to release the load when it has been positioned above the point at which it is to be deposited without causing the load to swing or to otherwise interfere with the placement of the load.

Various types of cargo hooks have been suggested which employ hooks which are aided in their releasing movement by the weight of the load. In most instances, however, these hooks have been provided with tripping latches which function to retain the hook in closed position and when operated to release the load to swing clear of the hook and permit it to open in response to the force of the load which is being carried upon the hook. It is apparent that this type of mechanism necessarily employs a number of movable parts which must be retained in a predetermined relationship with one another in order to insure operation of the releasing device and consequently such hooks must be carefully maintained in order to prevent derangement.

Hooks designed to avoid the multiplicity of parts as specified above must nevertheless be designed to safely retain the load carried on the hook when the load is being transferred to the point of discharge, and it has been the common practice to dispose the pivot point on which the hook is pivotally supported relatively to the load bearing surface of the hook so that the weight of the load shifts to one side of the pivot point and holds the hook on one side of a dead center in which position the fluke of the hook extends upwardly and thus retains the sling within the hook. This design ordinarily requires a heavy force to move the hook over the dead center and initiate releasing movement, and thereby the exact placement of the load above the point at which it is to be dropped is made impracticable since a sufficiently strong releasing force invariably causes the load to swing.

The present invention provides a cargo hook which is simple in design and which at the same time securely retains the load in a manner which permits it to be released with a minimum application of force and without disturbing the position of the load above the point at which it is to be deposited. These advantages are accomplished by utilizing a hook in which the point at which the load carried by the hook is supported, the pivot point of the hook on the associated hook frame, and the hoisting element of the frame are in vertical alignment when the hook is in its load bearing position, whereby a light force applied to the releasing arm of the hook will initiate movement of the hook towards its unloading position. An elongated pivot opening arranged relative to the load bearing surface of the hook as will be hereinafter described in detail, permits the load carried by the hook to add impetus to the movement towards releasing position but, at the same time, is designed to retain the sling or load bearing element on the hook while the load is being positioned for dropping, and thereafter permits the load to be released by applying slight additional force to the releasing arm.

Other advantages will be apparent from the following detailed description made with reference to the accompanying drawings in which:

Figure 1 is a side elevation of the hook embodying the instant invention in normal load bearing position;

Figure 2 is a side elevation illustrating the position of the elongated pivot slot of the hook relative to the hook retaining pin when the releasing movement has been initiated and illustrating in chain lines the position of the hook at a more advanced point of the releasing movement;

Figure 3 is a front elevation illustrating the construction of the hook frame;

Figure 4 is a diagrammatic representation of the direction and relative magnitude of the forces acting on the hook which tend to cause movement about its pivot point as a result of the weight of the load carried on the hook when in its normal load bearing position;

Figure 5 illustrates the rearrangement of the forces after the initial load releasing force has been applied to the hook and it has been shifted bodily relative to the retaining pin as a result of the force exerted by the load carried on the hook and the initial releasing force applied to the releasing arm; and Figure 6 illustrates the further rearrangement of the forces when further releasing force has been applied to the load releasing arm of the hook.

In the embodiment of the invention illustrated in the accompanying drawings, the cargo hook comprises a hook portion 10 which is provided with a releasing arm 11, an elongated pivot opening 12 and a slot 13 which is adapted to receive the bight of the sling or load bearing cable 14. A frame 15 is comprised of two similar face plates 16 which are rigidly affixed relative to each other and spaced apart by pins 17, 18 and 19. The pin 17 which serves as a hoisting attachment is adapted to receive the hook 20 of the hoisting line and the pin 19 supports a bushing 28, both of the latter elements extending through the elongated pivot opening 12 of the hook and serving as a pivot support for the hook. The lower face of the slot 13 is substantially parallel with the axis of the elongated pivot opening 12. In the preferable form of the invention the axis of the elongated pivot opening 12 is slightly divergent from the plane of the lower face of the slot 13 and one end of the elongated opening is formed directly above the load bearing portion of the surface of the lower face of the slot towards the closed end thereof, the elongated opening being extended in opposite direction from the mouth of the slot. The free end of the arm 11 is provided with the aperture through which the load release lanyard 21 is fixed permitting remote operation of the load releasing arm.

The normal load bearing position of the hook as illustrated in Figure 1 disposes the point of application of the load, indicated at 22, the hook retaining pin 19 and the hoisting element 17 in a vertical alignment. In this position the weight of the load results in the application of forces on the hook as indicated in Figure 4. In this position it will be seen that the load bearing face is inclined slightly upward and results in the bight of the sling tending to move towards the closed end of the slot. The tendency of the bight to move in the direction indicated is represented by the magnitude of the component 30 as illustrated in Figure 4, and it will be seen that the magnitude of the component 30 is a function of the angle of inclination of the face of the load bearing surface of the slot 13 and the axis of the elongated pivot opening 12. It is desirable to maintain this component as small as is consistent with insuring that such a component will exist continually during normal operations of the hook in which the load will swing freely, thus insuring that the hook will not accidentally shift towards releasing position. The component 30 is, however, made as small as feasible in order to minimize the force necessary to overcome this component when releasing movement is initiated by an application of force to the load releasing lanyard 21. When the load has been moved to the point of discharge, a force applied to the releasing lanyard will cause the hook to rotate about the hook retaining pin 19 and when the lower end of the elongated pivot opening 12 has been elevated to a point slightly above the axis of the hook retaining pin 19, the downward force exerted by the load will cause the hook to shift bodily relative to the retaining pin into the position indicated by the solid lines in Figure 2. At this point the inclination above the horizontal of the lower face of the slot 13 has not been reduced sufficiently to cause the bight of the sling to slip from the hook, and the load is thus retained on the hook and results in an application of forces on the hook tending to rotate the hook about its pivot point as indicated in Figure 5. It will be apparent that the component 31 which tends to cause the hook to rotate towards releasing position requires little supplementation of force from the load releasing lanyard to move the hook into the dotted line position of Figure 2, wherein the forces resulting from the downward pull of the load will be as indicated in Figure 6, in which position the load will tend to induce further rotary movement of the hook, as indicated by the increased magnitude of the component 32, and the frictional resistance between the load bearing surface of the hook and the sling will be overcome and the bight of the sling will slide clear of the hook.

It is notable that this construction permits adjustment of the degree of security with which the sling is to be retained on the hook by varying the angle of inclination between the load bearing face of the slot 13 and the axis of the elongated pivot opening 12, and at the same time utilizes a simple, positively acting design which also permits accurate control and handling of the load.

Having thus described the invention, what is claimed as new and desired to be secured by Letters Patent is:

1. A cargo hook device comprising a hook provided with an elongated pivot opening and a load bearing surface generally parallel therewith, a frame, a retaining pin supported by the frame and extending through said opening and thereby pivotably supporting said hook on said frame, a hoisting attachment secured to the frame, said attachment, pin, and surface being in vertical alignment when said device is in load bearing position, a load releasing arm fixed to said hook for causing said hook to rotate about said pin into position from which a force applied to said load bearing surface will cause said hook to shift relative to said pin towards load releasing position.

2. A cargo hook device comprising a hook provided with a load bearing surface, and an elongated pivot opening, a frame, a hook retaining pin supported by the frame and extending through said opening thereby pivotably supporting said hook on said frame, a hoisting attachment secured to said frame, said pin, attachment and surface being normally in alignment when the device is in load bearing position, and a load releasing arm fixed to said hook for causing said hook to move relatively to said pin towards load releasing position.

3. A cargo hook device adapted to be employed in an upright position comprising a frame, a hook pivotably supported on said frame, said hook being provided with an elongated pivot opening and a slot adapted to receive a load bearing element toward the inner end thereof, said slot and opening diverging slightly towards the mouth of the slot and the inner end of the slot being located directly beneath the upper end of said opening, said frame having a hoisting attachment towards its uppermost end and a hook retaining pin towards its lower end, said pin extending through said opening and pivotably supporting said hook as aforesaid, said pin, attachment, and load bearing portion of said slot being in alignment when said device is in load bearing position, a load releasing arm fixed to said hook, and means provided on said arm for causing said hook successively to rotate about said pin, shift bodily relative to said pin toward load releasing position, and to rotate about said pin into load releasing position.

4. A cargo hook device adapted to be utilized in an upright position comprising a frame, a hoisting attachment on the frame, a hook provided with an elongated pivot opening normally disposed at a slight angle to the horizontal and a load bearing surface generally parallel therewith, a hook retaining pin supported on the frame and extending through said opening toward the normal upper end thereof, said pin, said attachment, and said surface being in a vertical alignment when said device is in normal load bearing position, and a load releasing arm secured to said hook for rotating the hook about said pin and raising the lower end of said opening above the horizontal, whereby force applied to said surface will cause said hook to shift relatively to said pin towards load releasing position.

5. A cargo hook device comprising a suspended member, a suspension means connected thereto towards the upper end thereof, and a horizontally disposed hook supporting element supported thereon towards the lower end thereof, a hook provided with a downwardly facing linear surface engaging said hook supporting element, an upwardly facing load bearing surface vertically beneath and diverging slightly relative to said downwardly facing surface towards the mouth of said hook, said suspension means, said hook supporting element, and said load bearing surface being in vertical alignment when said hook is in its normal load bearing position, means attached to said hook for causing said hook to rotate about said supporting element, whereby force applied to said downwardly facing load bearing surface will cause said hook to shift relatively to said supporting element towards load releasing position.

NILS JOHNSON.

REFERENCES CITED

The following references are of record in the file of this patent:

UNITED STATES PATENTS

| Number | Name | Date |
| --- | --- | --- |
| 1,500,903 | Shipley | July 8, 1924 |